(12) United States Patent
Fernandez Acuna et al.

(10) Patent No.: US 10,116,613 B2
(45) Date of Patent: Oct. 30, 2018

(54) SYSTEMS AND METHODS FOR MANAGING SOCIAL MEDIA POSTS

(71) Applicant: Amadeus S.A.S., Biot (FR)

(72) Inventors: Alfredo Fernandez Acuna, London (GB); Vincent Domurado, London (GB); Adrien Bardon, Nantey (FR)

(73) Assignee: AMADEUS S.A.S., Biot (FR)

(*) Notice: Subject to any disclaimer, the term of this patent is extended or adjusted under 35 U.S.C. 154(b) by 368 days.

(21) Appl. No.: 14/948,598

(22) Filed: Nov. 23, 2015

(65) Prior Publication Data
US 2017/0149722 A1    May 25, 2017

(51) Int. Cl.
H04L 12/58    (2006.01)
H04L 29/08    (2006.01)

(52) U.S. Cl.
CPC .............. H04L 51/32 (2013.01); H04L 51/02 (2013.01); H04L 51/16 (2013.01); H04L 67/22 (2013.01)

(58) Field of Classification Search
CPC ......... H06L 51/32; H06L 67/10; G06Q 10/02; G06Q 10/107; G06Q 50/01; G06Q 50/26; H04L 51/32; H04L 51/02; H04L 67/22; H04L 51/16
See application file for complete search history.

(56) References Cited

U.S. PATENT DOCUMENTS

| | | | | |
|---|---|---|---|---|
| 9,618,343 | B2* | 4/2017 | Kahn | H04W 4/21 |
| 9,646,604 | B2* | 5/2017 | Erhart | G10L 15/06 |
| 9,842,298 | B1* | 12/2017 | Wansley | G06N 5/04 |
| 2011/0034183 | A1* | 2/2011 | Haag | G06Q 50/26 455/456.3 |
| 2011/0225257 | A1* | 9/2011 | Tilden | G06F 17/30867 709/207 |
| 2012/0066345 | A1* | 3/2012 | Rayan | H04M 3/5116 709/218 |
| 2013/0166330 | A1* | 6/2013 | Marziali | G06Q 10/02 705/5 |
| 2014/0114978 | A1* | 4/2014 | Chatterjee | G06Q 10/107 707/739 |
| 2014/0344050 | A1* | 11/2014 | McKinley | H04W 4/21 705/14.45 |
| 2015/0172145 | A1* | 6/2015 | Skiba | H04L 67/10 709/224 |
| 2015/0189084 | A1* | 7/2015 | Mohler | H04M 3/5116 379/45 |
| 2016/0359791 | A1* | 12/2016 | Zhang | H04L 51/32 |
| 2017/0091617 | A1* | 3/2017 | Baughman | G06N 3/08 |

* cited by examiner

Primary Examiner — Patrice L Winder
(74) Attorney, Agent, or Firm — Thompson Hine LLP (57) ABSTRACT

Methods, systems, and computer program products for interacting with a social media networking system. Information related to occurrence of an event impacting travel may be received from a travel data source at one or more computers. In response to receiving the information related to the event, the one or more computers trigger a request to the social media networking system to return one or more first posts related to the event.

15 Claims, 7 Drawing Sheets

SYSTEMS AND METHODS FOR MANAGING SOCIAL MEDIA POSTS

TECHNICAL FIELD

The invention generally relates to computers and computer software, and in particular to methods, apparatus, and computer program products for managing social media posts.

BACKGROUND

Computer technology is increasingly used in the travel industry to manage and support travel reservations, as well as data associated therewith. In particular, travel providers such as airlines have been adopting social media platforms in order to perform various activities. Some examples of the activities that may be performed using a social media platform include scanning of social media posts by various users to identify direct and indirect references to a particular airline, providing answers to specific airline and travel related questions received either publicly or privately via the social media platform, and providing specific service requests to a particular customer via the social media platform.

In some instances a social media post, such as an inquiry regarding a travel reservation that is particularly applicable to a single customer, may be made via the social media platform. In response to the social media post, a travel employee such as a social media manager for, e.g., an airline or an agent of a travel agency (e.g., an on-line travel agency), may need to address the specific social media post. It is to be appreciated that the response only needs to be directed to the particular customer, and not the general public. However, before responding to the post, the travel employee must first correctly identify the individual who generated the social media post by initiating a private conversation with the particular customer.

Social media posts are not prioritized in real time based on the details of the particular customers, despite the possibility that one or more of the customers be a high value customer of the airline who should receive prompt attention in comparison with customers of lesser value. When answering posts, the travel employee may make decisions without any knowledge of customer value. Furthermore, many social media posts are time sensitive and are only relevant for a relatively short period of time. For example, a customer may post a question about a connecting flight in a post while waiting for the connecting flight at an airport terminal. Thus, it may be especially desirable to identify and address time-sensitive social media posts as quickly as possible, before they become irrelevant.

Occasionally, an airline may also encounter another type of issue related to social media in which a user may post a comment that indirectly references the airline. Specifically, the user may post a negative or positive comment that indirectly references the airline; however, the particular airline is not mentioned by name in the post. For example, a user may post the following comment: "I hated my flight today from Heathrow to Nice". While there is no specific reference to a particular airline, the user has still expressed negative feeling about his or her experience on a flight operated by the airline in this comment. Indeed, such a post may be of interest to the airline.

Improved methods, systems, and computer program products are needed for enabling a travel provider to manage social media posts.

SUMMARY

Embodiments of the invention are directed to methods, systems, and computer program products for interacting with a social media networking system. Information related to occurrence of an event impacting travel may be received from a travel data source at one or more computers. In response to receiving the information related to the event, the one or more computers trigger a request to the social media networking system to return one or more first posts related to the event.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
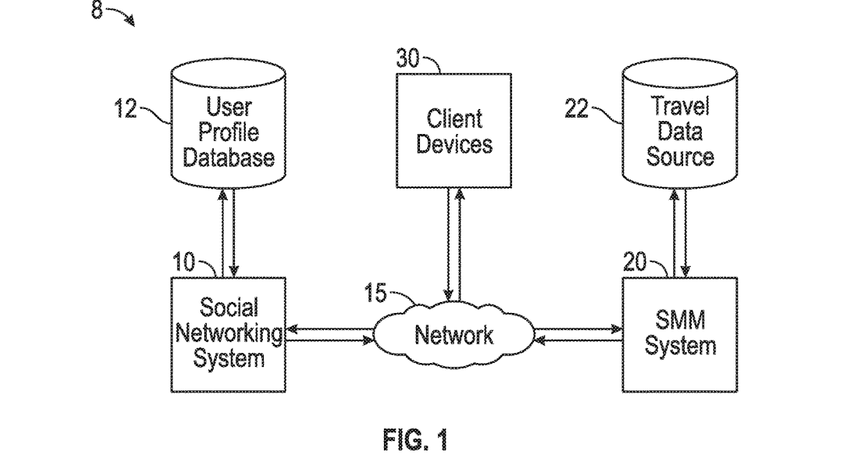
FIG. 1 is a diagrammatic view of an operating environment including a social (media) networking system, client devices, and a social media management (SMM) system in accordance with an embodiment of the invention.

Referring now to FIG. 1, an operating environment 8 in accordance with an embodiment of the invention may include a social media social networking system 10 (also referred to herein as a social networking system or platform), client devices 30, and a social media management (SMM) system 20 that are all connected with each other through a network 15. The network 15 may include portions of one or more private or public networks (e.g., the Internet, a virtual private network, a local area network, a wide area network, a cellular telephone network, etc.) that provide interconnection and facilitate the exchange of data containing information.

The client devices 30 may be electronic devices including hardware, software, or embedded logic components and capable of carrying out supported functionalities. Representative client devices 30 may include a computer system such as a desktop computer or, alternatively, a mobile electronic device such as a notebook, a laptop computer, a tablet computer, a cellular telephone, a smartphone, etc. Each client device 30 may enable its user to communicate with other systems, such as the social media networking system 10, via the network 15. The users of the client devices 30 may be subscribers (e.g., individuals or business entities) to the social media networking system 10 who have the capability to publish posts and exchange public or private messages with each other. For example, a travel provider (e.g., an airline) may subscribe to the social media networking system 10 and may have rights similar or identical to those of individuals who are subscribers. A social media manager at the travel provider may interact with individual subscribers in the general public via the social media networking system 10.

The social media networking system 10 provides users of a social media network with the ability to communicate and interact with each other. Users may join the social media networking system 10 and then establish connections or relationships with a number of other users of the social media networking system 10. A user of the social media networking system 10 may be categorized as a friend or follower of another user of social media networking system 10. The social media networking system 10 may store social graphs incorporating the user-defined connections, associations, and relationships in one or more data stores.

The social media networking system 10 may include or have access to a user profile database 12 that contains a profile for each social media user subscribing to the social media networking system 10. A user profile includes data fields containing information describing various attributes of the corresponding social media user. For example, the user profile may contain biographic, demographic, and other types of descriptive information (employment, education, personal preferences, interests, location, images, videos, etc.). A unique identifier may be assigned to each user of the social media networking system 10 and may be associated with the user profile in the user profile database 12. The social media networking system 10 may provide users with the ability to post content to the social media networking system 10, which is stored by the social media networking system 10 as user-generated content objects. In particular, the social media networking system 10 may provide users with the ability to post comments or questions regarding their travel reservations that are posted on the social media networking system 10.

The social media networking system 10 may be capable of linking with a variety of entities, such as a travel provider (e.g., airline) associated with the SMM system 20 and the users associated with the client devices 30. A travel provider subscribing to the social media networking system 10 is a user of the social media networking system 10, and therefore has access to all the same capabilities (sending and receiving messages, etc.) as the individuals in the general public who are users of the social media networking system 10. In particular, the social media networking system 10 may provide content (e.g., posts) to the SMM system 20 from users subscribing to the social media networking system 10, and may enable the SMM system 20 to interact with those social media users at the client devices 30. The SMM system 20 also communicates with the social media networking system 10 through an application programming interface (API) or other communication channel. For example, a user of the social media networking system 10 at a client device 30 may publish a social media post, which is then, through the communication channel (e.g., API), pushed to the SMM system 20. In general, the social networking system 10 may push posts to the SMM system 20 that meet criteria subscribed to the SMM system 20. As examples, the SMM system 20 may subscribe to posts by social media users that are addressed to a specific travel provider (e.g., airline), to posts containing certain keywords, to posts sent by specific social media users, etc. Additionally, the SMM system 20 can retrieve details (e.g., name, friends, number of TWEETS or posts, etc.) about the social media user from the social networking system 10 via a communication channel (e.g., API). As another example, the SMM system 20 may send communications (e.g., an answer to a post) through a communication channel (e.g., an API) linked to the social media networking system 10 to the client device 30 of a social media user.

The SMM system 20 may communicate over the network 15 with a travel data source 22. The travel data source 22 represents one or more entities or repositories that supply or provide travel-related data or information, such as (in an air travel context) travel reservations for passengers, passenger profiles, flight information, flight schedules, availability, etc. The travel data source 22 may comprise one or more databases or, alternatively, any kind of service or repository that provides travel-related data.

The SMM system 20 may request data from the travel data source 22 based on the identity of a social media user in an attempt to identify a travel record containing passenger information corresponding to the social media user. The travel record may contain, for example, the identity of the passenger, his/her contact information, his/her social media identification, and his/her past and/or future travel reservations. If a matching travel record containing a customer profile is not found in the travel data source 22, the SMM system 20 may then attempt to formulate a different search for similar customer profiles (e.g., a passenger or traveler having the same last name as the perceived last name of the social media user), and send an automated request to the social media user asking for confirmation. If a matching customer profile is not found in the travel data source 22 or is unclear based on the information found at the travel data source 22, the SMM system 20 may send an inquiry to the social media user to request additional information, such as a flight number, a booking reference, or other data, that can be used to identify a travel record of a passenger that corresponds to the social media user. To that end, the response to the inquiry may be used by the SMM system 20 to initiate another request for data from the travel data source 22 for a travel record containing a customer profile and/or a travel reservation for a passenger corresponding to the social media user. If the user was previously not identified and upon successful identification following a request for additional information, the SMM system 20 may record a link between the social media user and the travel record in the travel data source 22 (e.g., data added to the travel record) to ensure successful identification in the future without the necessity for requesting additional information. A link between the social media user and the travel record may be records in the social media database 56 (FIG. 2)

Figure 2:
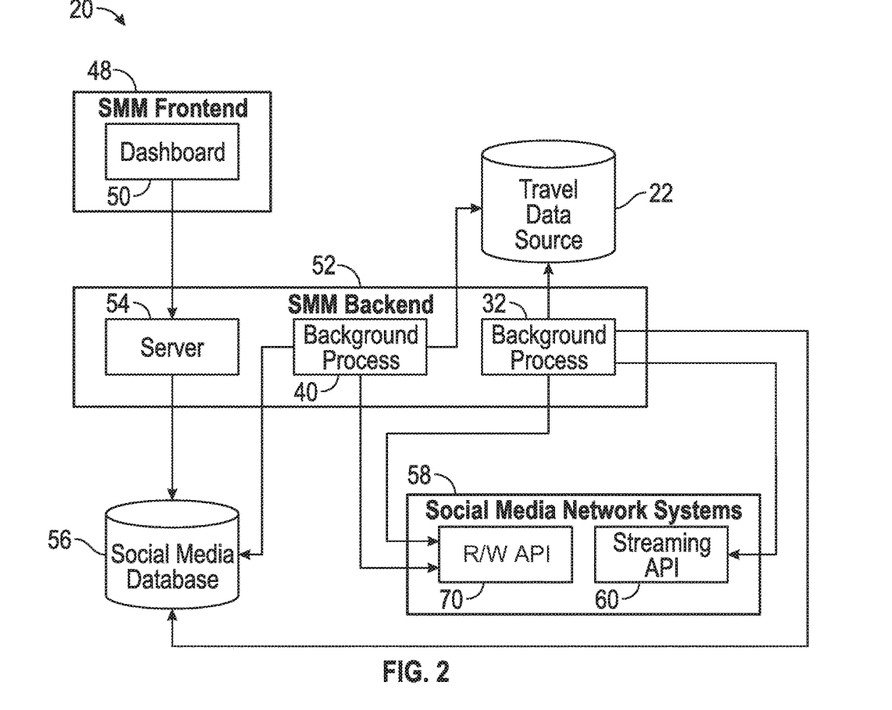
FIG. 2 is a diagrammatic view of the SMM system illustrated in FIG. 1 and in accordance with an embodiment of the invention, where the SMM system is in communication with social media networking systems and databases/data sources.

With reference to FIG. 2, the SMM system 20 may be implemented on one or more computer devices or servers and databases. In the exemplary embodiment as shown in FIG. 2, the SMM system 20 may include a front end 48 that supports a dashboard 50, and a back end 52 including a server 54 with background processes 32, 40 executing on it. The SMM system 20 may also be in communication with the travel data source 22 and one or more social media network systems 58 that are each similar to social media networking system 10. The front end 48, the back end 52, the travel data source 22, and the social media network systems 58 are in communication with one another via the network 15.

The dashboard 50 represents a graphical-user-interface (GUI) that may be accessible to an agent (e.g., a social media manager) and that may be displayed at one of the client devices 30. The dashboard 50 may be used to display published social media posts that are received by the SMM system 20, and may be used to handle (e.g., trigger answers to) those social media posts.

Figure 3:
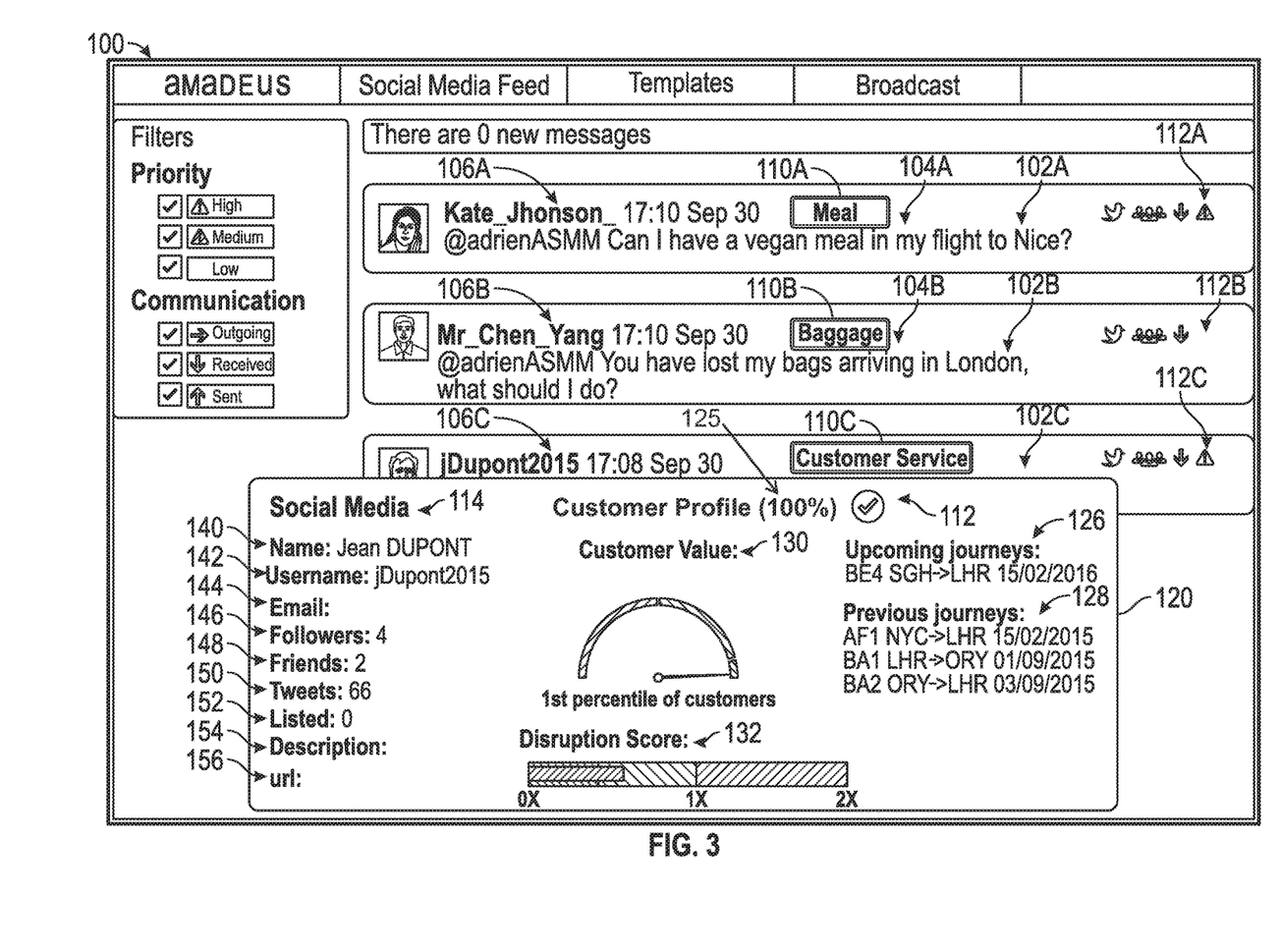
FIG. 3 is an exemplary display of a dashboard generated by the SMM system and in accordance with an embodiment of the invention, where the dashboard displays posts generated by users of the social media networking system and information obtained by the SMM system from a travel data source pertaining to a customer identified as being correlated with a selected one of the social media users.

FIG. 3 illustrates an exemplary dashboard 100, which displays one or more incoming social media posts 102A-102C that may reference, or are relevant to, a particular travel provider (e.g., airline). As may be seen in FIG. 3, the social media posts 102 each include specific requests 104A-104C (the request 104C is not visible in FIG. 3) made by a particular social media user 106A-106C as respective published posts. For example, social media user 106A (Kate Jhonson) may publish a post requesting a vegan meal for her flight to Nice. In some instances, the social media users 106A-106C may be also customers of a travel provider (e.g., passengers of an air carrier) and may have information stored in data stored at the travel data source 22. The information may include details of a travel reservation that is associated with a customer (e.g., traveler or passenger) that can be linked with social media user 106A (Kate Jhonson). The SMM system 20 can receive social media posts from anyone in the general public subscribing to the social networking systems 58. However, posts from users who are also customers of a particular travel provider may be displayed, along with information from the travel data source 22, at the dashboard 100 to contextualize the social media post.

As may be seen in FIG. 3, each request 104 may be classified into one or more particular categories 110A-110C. In the representative embodiment in FIG. 3, the categories 110A-110C may include meals, baggage, or customer service. However, it is to be understood that other types of categories may exist as well. A request 104 may be categorized in multiple categories 110A-110C. For example, a post stating "Do I need to check in my bag again in my connecting flight?" would be categorized as in multiple categories 'check-in', 'baggage', and 'connecting flight'.

The requests 104A-104C may be ranked by priority based on the potential social media impact of the social media user, as well as information relating to the customer/passenger who is linked by the SMM system 20 to the social media user. For example, in the embodiment as shown the user 106A has a medium priority 112A, the user 106B has a low priority 112B, and the user 106C has a high priority 112C. The priority of each individual request may be based on information in the customer profile 112 (e.g., customer value, disruption score, frequent flyer program information, previous and future travel reservations, etc.) for a passenger linked to the social media user, as well as the social media presence 114 (e.g., details of the social media network (followers, TWEETS, etc.)) of the social media user. The customer profile 112 may be obtained from the travel data source 22 in response to a query from the SMM system 20. The social media presence 114 may be information from a social media user profile that is obtained from the user profile database 12 via a read/write API 70 of the social networking systems 58.

As seen in FIG. 3, an agent may activate a pop-up or secondary screen 120 for a particular user 106C by moving or hovering a pointer or other digital indicator over the user's screen name. For example, in the embodiment as shown in FIG. 3, an agent hovers a pointer (not illustrated) over the user name jDupont2015, which generates the secondary screen 120 containing information from travel data source 20. A degree of certainty 125 of the correlation between the social media user and the traveler (e.g., passenger) may be determined by the SMM system 20 and displayed on the dashboard 100. The degree of certainty 125 is an indication of the level of confidence that the customer profile being displayed on the secondary screen 120 corresponds to the social media user who published the post at issue. The degree of certainty 125 may depend on a number of details matched between the social media user profile and the customer profile, and may be expressed in the display as a percentage between 0% and 100%. For example, the representative degree of certainty 125 is given as "(100%)" that the customer in the secondary screen is correlated with the social media user jDupont2015. The degree of certainty 125 may increase to 100% as a result of a successful confirmation from the user as described in steps 408 and 410 of FIG. 5. The secondary screen 120 may also display information relating to the social media presence 114 of the social media user jDupont2015 and information relating to the customer profile 112 that is associated with a traveler or passenger identified by the SMM system 20 to correlate with the social media user jDupont2015. The customer profile 112 may include parameters such as a list of future travel reservations 126 relating to the passenger, a list of past travel reservations 128 relating to the passenger, the customer value 130 for the passenger, and the disruption score 132 for the passenger, as well as other parameters characterizing the user or related to the passenger. The computation of the priority may be based on one or more of these parameters for the passenger, as well as details of social media presence for the passenger as a social media user.

The customer value 130 may indicate how valuable or important a customer's business is to a specific travel provider (e.g., airline) and may be based on factors including, but not limited to, the total miles flown by the customer as a passenger, the particular cabin class flown (e.g., economy or first class), an amount of money spent on the airline, and a frequent traveler tier or status. In the exemplary embodiment as shown in FIG. 3, the social media user jDupont2015 corresponds to a passenger who has a customer value score that is equivalent to the 1st percentile of all customers. In other words, the passenger corresponding to the social media user jDupont2015 is a very important customer to the specific airline.

The disruption score 132 is an indication of the level of disruption that a particular customer has experienced while traveling. Some factors that may influence the disruption score 132 include, but are not limited to, a number of previously canceled flights, a number of previously delayed flights, and/or lost baggage events in the past. For example, the disruption score 132 for a customer will generally increase with an increasing number of canceled and/or delayed flights. In other words, a customer who has experienced a large number of canceled and/or delayed flights as a passenger would be assigned a comparatively high disruption score 132 relative to a customer who has experienced a lesser number of canceled and/or delayed flights as a passenger.

The social media presence 114 includes information associated with the social media user that may be extracted from the user profile database 12. In other words, the social media presence 114 may include information that is associated with the social media user's profile in the user profile database 12. In the example as shown, the social media presence 114 may include the user's name 140 (e.g., Jean Dupont), the user's screen name 142 associated with the social media account, the user's email address 144, the number of followers 146 associated with the user's social media account, the number of friends 148 associated with the user's account, the number of posts 150 (e.g., TWEETS or FACEBOOK status) associated with the user's account, the number of lists 152 associated with the user's account, a description 154 associated with the user's account, and the uniform resource locator (URL) 156 associated with the user's account.

Returning to FIG. 2, the server 54 of the back end 52 of the SMM system 20 may receive the specific requests 104A-104C in posts made by the various users 106A-106C (FIG. 3), and may interact with the front end 48 and its dashboard 50. Specifically, the background process 32 of the back end 52 is in communication with one or more social media network systems 58 and the travel data source 22. Specifically, the background process 32 is in communication with the social media networking system(s) 58 via a streaming API 60 and a read/write API 70, which are both part of each social media network system 58. The streaming API 60 and the read/write API 70 represent generic APIs found in different social media networking systems 58 that provide programmatic access to real-time publish/subscribe services (streaming API 60) and that provide programmatic access to read and write data (read/write API 70). The streaming API 60 may be directed to receive a stream of public data flowing through the social media networking systems 58. The server 54 is also in communication with a social media database 56, which stores dynamic information relating to posts that can be displayed in the graphics visible on the dashboard 100. The social media database 56 is external to the social media networking systems 58 and may contain data from several different social media networking systems 58, as well as data that is not normally contained in the user profile database 12 that is linked to the social media networking systems 10, 58.

The server 54 is accessed by the social media manager through the dashboard 50. Server 54 is also in charge of handling requests received from the dashboard 100, which represents a specific embodiment of dashboard 50. The server 54 also has access to the social media database 56 in which dynamic information relating to posts is stored and from which dynamic information is obtained in order for the dashboard 50 to be rendered graphically.

The background process 32 is in charge of listening on the social media network systems 58 and, to that end, maintains an open connection to the streaming API 60 of each social media network system 58. The SMM system 20 provides instructions to the streaming API 60 that are used by the social media networking system 10 to monitor social media posts being published by social media users in real time and to direct relevant social media posts to the SMM system 20. For example, the SMM system 20 may request receipt of all posts that are addressed to a given travel provider (e.g., airline) and/or contain a set of keywords. Based on the content of these instructions, the streaming API 60 will feed, in real time, social media posts being published by social media users to the background process 32. Whenever a social media user sends a social media post to a particular social media network 58 concerning the airline, then the streaming API 60 will notify background process 32.

The background process 32 may then determine the category or categories 110 of each specific request 104. The categorization may be selected from a list of airline-related topics, including but not limited to check-in, baggage, connecting flights, reservation, etc.

The background process 32 will contact the travel data source 22 to attempt to find passenger data corresponding to the social media user who published the relevant social media post. To that end, the SMM system 20 may request and receive data from the travel data source 22 in order to correlate the social media user who generated the specific request 104 with a customer profile associated with a traveller and stored by the travel data source 22. Specifically, the background process 32 may obtain information such as, for example, the identity of the passenger, contact information, social media identification, and past and/or future travel reservations from the travel data source 22 in order to verify the identity of the social media user 106 associated with the specific request 104 and to match the social media user 106 with information (e.g., traveler name) in a customer profile. The determination of a level of confidence (i.e., degree of certainty 125) for the correlation between the match between the social media user and the customer profile is discussed hereinabove.

After the identity of the social media user is matched with a customer profile based on data contained in the travel data source 22, the priority of the associated social media post may be computed using the passenger data in the customer profile in combination with details of the social media user profile that is associated with the social media post. The background process 32 may request and receive details of a social media user profile from the social media networking system 10 and its user profile database 12 using the read/write API 70 as a communication channel. For example, with reference to FIG. 3, the details of the social media user profile may include information associated with the user's social media account such as, but not limited to, the user's name 140, the user's screen name 142 associated with the social media account, the user's email address 144, the number of followers 146 associated with the user's social media account, the number of friends 148 associated with the user's account, the number of posts 150 associated with the user's account, the number of lists 152 associated with the user's account, a description 154 associated with the user's account, and the URL 156 associated with the user's account. The result of the determinations by background process 32, as well as the social media post triggering the computation, are stored in the social media database 56. Information stored in the social media database 56 may be communicated from server 54 to the SMM frontend 48 and displayed to the social media manager via the dashboard 50 at the SMM frontend 48.

If a customer profile associated with the user 106 who generated the specific request 104 cannot be established based on data contained in the travel data source 22, then the specific request 104 may be marked or tagged in the social media database 56 for further identification. Under these circumstances, the background process 40 may send an inquiry to the social medial user 106 with the intent of prompting a reply from the user that could lead to successful identification of a customer profile for a traveler (e.g., passenger) in a travel record at the travel data source 22. The inquiry may include a request for information identifying specific details pertaining to the user's travel reservation (e.g., the flight number on a particular airline or a booking reference number). Upon receipt of a reply, the background process 32 may again contact the travel data source 22 to attempt to associate a customer profile (e.g., a passenger travel record) with the social media user 106 who published the relevant social media post.

Referring to both FIGS. 2-3, the social media manager may be able to directly answer a specific question posed by the social media user's request 104 published as a post at the social media networking system 10. For example, the social media manager may be able to generate a well-structured answer using the information, including passenger information supplied by the SMM system 20, displayed on the dashboard 100 to inform Kate Jhonson that a vegan meal is not available on her flight to Nice. The replies generated by the social media manager may be initially stored in the social media database 56. The background process 40 may later extract replies from the social media database 56 that need to be sent to the social media users 106. To that end, the background process 40 sends such replies via the read/write API 70 to the social media networking system 10 for subsequent publication as responsive posts to the client device 30 of the social media user. The dashboard 100 may also be updated to indicate that an answer has been sent. In response to receiving a confirmation from the social media networking system 10 via the read/write API 70 that the reply has been received by the social media user, the background process 40 may update the social media database 56 to reflect the confirmation and that the social media post has been addressed.

In addition to the social media manager answering and addressing any issues or concerns that the social media users may have, the SMM system 20 may also support the generation of automatic or automated replies to posts posing various issues and concerns. In particular, the SMM system 20 may link a specific post of one of the social media users 106 to a travel reservation (e.g., a specific flight) in a customer profile based on the data received from the travel data source 22. If specific information pertaining to a travel reservation (e.g., a specific flight) is not found, then the SMM system 20 may generate an inquiry to the user 106 asking for additional information (e.g., flight information). Once the travel reservation (e.g., a specific flight) associated with passenger corresponding to the social media user 106 has been located, then the SMM system 20 may employ natural language processing to determine a topic or combination of topics characterizing the post (e.g., meals, baggage, etc.). The SMM system 20 may then determine or formulate an answer based on flight information as well as the topic of the post, and send the automated answer via the read/write API 70 through the social media networking system 10 to the client device 30 of the social media user 106. Alternatively, in another embodiment, the SMM system 20 may send an automated answer only to the social media manager via the dashboard. If the social media manager determines that the answer is sufficient, then the social media manager may trigger an answer or an adapted version of the automated answer to be sent via the read/write API 70 through the social media networking system 10 to the client device 30 of the social media user 106. The background process 40 may update the social media database 56 to reflect confirmation that the answer was received by the social media user 106 and that the social media post has been addressed. Dashboard 100 may also be updated to indicate that an answer has been sent to and received by the social media user.

The updates to the social media database 56 may provide a history of past communications between the user and the travel provider. This history of past communications may be used, for example, to designate a particular social media manager for assignment to address a future post, or may be used by the assigned social media manager to address a future post.

Figure 4:
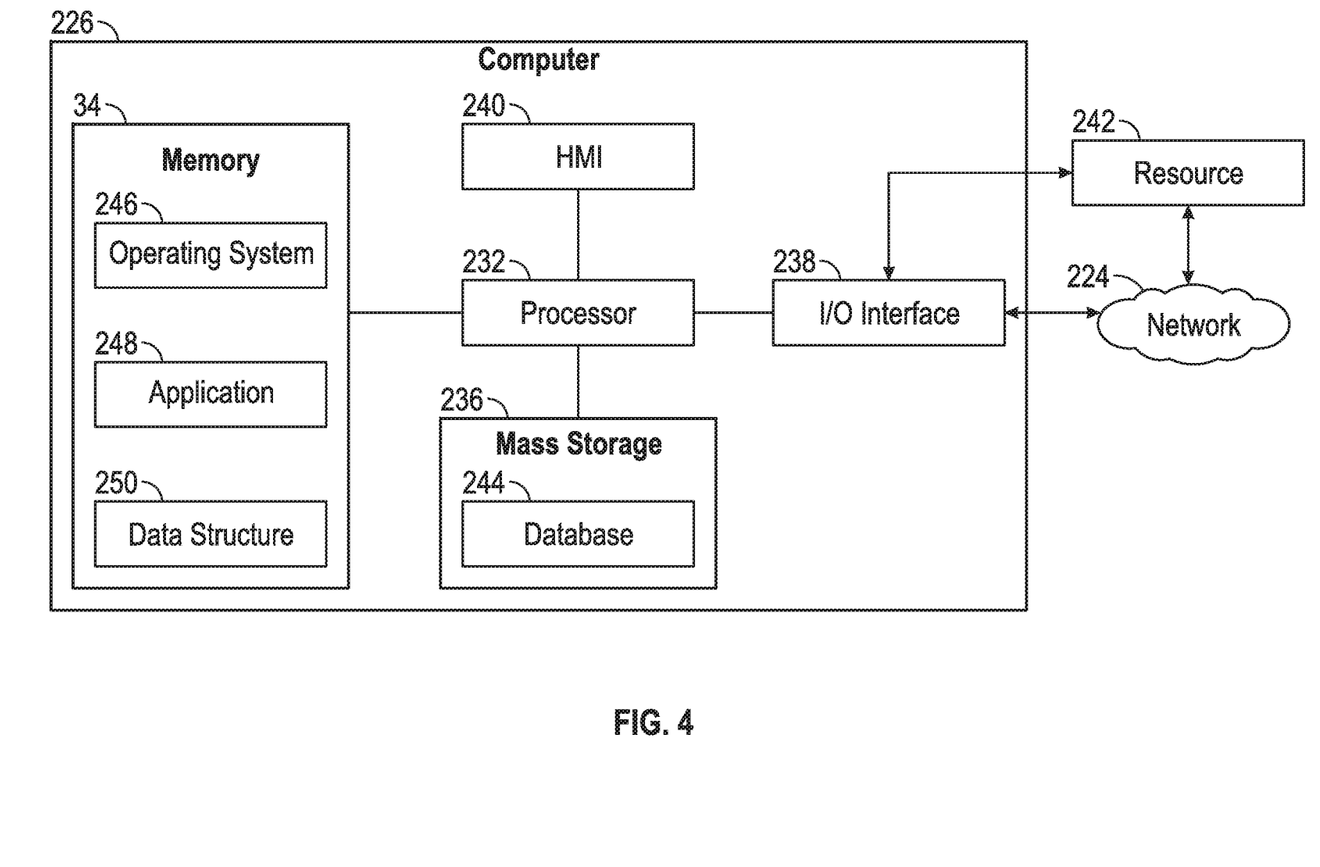
FIG. 4 is a diagrammatic view of an exemplary computing system for the computing devices or systems of FIGS. 1 and 6.

Referring now to FIG. 4, the SMM system 20 and client devices 30 of the operating environment 8 may be implemented on one or more computer devices or systems, such as exemplary computer system 230. The computer system 230 may include a processor 232, a memory 234, a mass storage memory device 236, an input/output (I/O) interface 238, and a Human Machine Interface (HMI) 240. The computer system 230 may also be operatively coupled to one or more external resources 242 via the network 226 or I/O interface 238. External resources may include, but are not limited to, servers, databases, mass storage devices, peripheral devices, cloud-based network services, or any other suitable computer resource that may be used by the computer system 230. Network 226 may correspond to network 15 or network 515.

The processor 232 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 234. Memory 234 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, volatile or non-volatile solid state device, or any other device capable of storing information.

The processor 232 may operate under the control of an operating system 246 that resides in memory 234. The operating system 246 may manage computer resources so that computer program code embodied as one or more computer software applications, such as an application 248 residing in memory 234, may have instructions executed by the processor 232. In an alternative embodiment, the processor 232 may execute the application 248 directly, in which case the operating system 246 may be omitted. One or more data structures 250 may also reside in memory 234, and may be used by the processor 232, operating system 246, or application 248 to store or manipulate data.

The I/O interface 238 may provide a machine interface that operatively couples the processor 232 to other devices and systems, such as the network 224 or external resource 242. The application 248 may thereby work cooperatively with the network 226 or external resource 242 by communicating via the I/O interface 238 to provide the various features, functions, applications, processes, or modules comprising embodiments of the invention. The application 248 may also have program code that is executed by one or more external resources 242, or otherwise rely on functions or signals provided by other system or network components external to the computer system 230. Indeed, given the nearly endless hardware and software configurations possible, persons having ordinary skill in the art will understand that embodiments of the invention may include applications that are located externally to the computer system 230, distributed among multiple computers or other external resources 242, or provided by computing resources (hardware and software) that are provided as a service over the network 226, such as a cloud computing service.

The HMI 240 may be operatively coupled to the processor 232 of computer system 230 in a known manner to allow a user to interact directly with the computer system 230. The HMI 240 may include video or alphanumeric displays, a touch screen, a speaker, and any other suitable audio and visual indicators capable of providing data to the user. The HMI 240 may also include input devices and controls such as an alphanumeric keyboard, a pointing device, keypads, pushbuttons, control knobs, microphones, etc., capable of accepting commands or input from the user and transmitting the entered input to the processor 232. The HMI 240 may be configured to display the dashboard 50 or dashboard 100 that are utilized by the social media manager to interact with the SMM system 20.

A database 244 may reside on the mass storage memory device 236, and may be used to collect and organize data used by the various systems and modules described herein. The database 244 may include data and supporting data structures that store and organize the data. In particular, the database 244 may be arranged with any database organization or structure including, but not limited to, a relational database, a hierarchical database, a network database, or combinations thereof. A database management system in the form of a computer software application executing as instructions on the processor 232 may be used to access the information or data stored in records of the database 244 in response to a query, where a query may be dynamically determined and executed by the operating system 246, other applications 248, or one or more modules. The database 244 may comprise the social media database 56.

Figure 5:
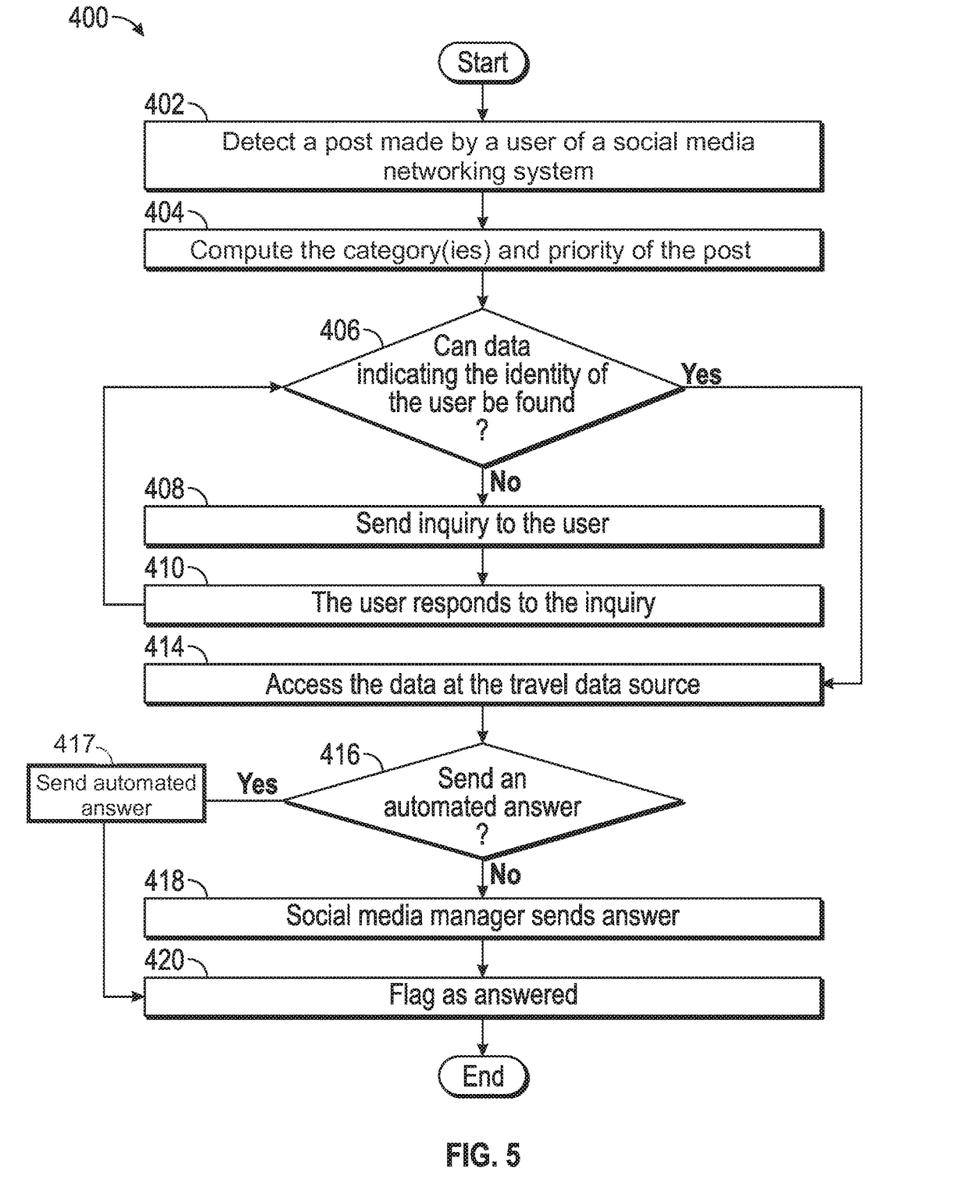
FIG. 5 is a flowchart in accordance with an embodiment of the invention that details a process that may be executed by the SMM system to reactively identify, based on information from the travel data source, a customer who is associated with a post published at the social media networking system and to handle the post based on the information.

Turning now to FIG. 5, a flowchart that depicts a process 400 that may be performed by the SMM system 20 to determine the identity of a user who generates or posts a publication as a specific request. Referring to FIGS. 2-3 and 5, the process 400 may begin at block 402, where the SMM system 20 detects a specific post by a social media user that is published by the social media networking system 10. The request 104 may reference a particular travel provider (e.g., an airline in the representative embodiment) by being addressed to the airline or concerning the airline. For example, with specific reference to FIG. 3, social media user 106A (Kate Jhonson) may make a specific request 104A for a vegan meal for her flight to Nice. As another example, a social media user may want to receive an answer containing details concerning an announced flight delay and address a question in a post directed to the airline.

To detect posts, the SMM system 20 may subscribe to the API 60 supplied by the social media networking system 10, where the SMM system 20 tells the social media networking system 10 that it wants to receive posts meeting certain criteria, such as posts that name a travel provider (e.g., an airline) or posts that concern or are relevant to that travel provider. These posts, which may be linked to the social media username of the travel provider or may contain certain keywords relating to the travel provider, are pushed by the social media networking system 10 over a communication channel (e.g., API 60) to the SMM system 20 as they occur in real-time. The social media posts pushed to the SMM system 20 are stored by the SMM system 20 in the social media database 56 and flagged in the social media database 56 with a status of 'not-answered'. Process 400 may then proceed to block 404.

In block 404, the SMM system 20 may compute a priority of the post based on known details regarding the user. At this point in the process, the priority may not necessarily include customer value, disruption score, etc. because the user has not been identified using the travel data source 22. However, social media network details (followers, TWEETS, etc.) are available to compute a priority. To that end, the SMM system 20 may access the social media API to determine a number of friends or followers, history of communications, etc. for the social media user from the user profile database 12 associated with the social media networking system 10. The SMM system 20 may also compute one or more categories (e.g. meal, baggage, etc.) to classify or categorize the post. Process 400 may then proceed to block 406.

In block 406, the SMM system 20 queries or otherwise searches the travel data source 22 for data contained therein (e.g., a travel record) relating to a passenger who can be identified with the social media user 106 who generated the specific request 104. The social media user may be, for example, a passenger with a travel reservation on a flight serviced by an airline. To identify the social media user 106 associated with the specific request 104, the back end 52 may request and receive information such as, for example, passenger data and travel reservations from the travel data source 22. In this manner, the SMM system 20 attempts to link the social media user to data (e.g., a travel record) stored at the travel data source 22 that is linked with a passenger whose identity is the same as the social media user and including the flight data (e.g., a flight number) for a travel reservation of the passenger/social media user. The SMM system 20 may label the category or categories of the post (or set the topic(s) of the post).

The SMM system 20 may successfully find a travel record containing a travel reservation a passenger corresponding to the social media user in the travel data source 22. However, if flight data for a specific flight for a passenger linked to the social media user is not found or is unclear, the process 400 may then proceed to block 408. For example, the flight data may not be clear because several flights for a passenger corresponding to a social media user are found in the travel data source 22 and create an ambiguity.

In block 408, the SMM system 20 may send an automated inquiry to the social media user 106. The inquiry includes a request for information identifying specific details pertaining to the user's travel reservation. For example, the inquiry may request a flight number or a booking number associated with a particular travel reservation in order to identify a passenger associated with the social media user 106. Process 400 may then proceed to block 410.

In block 410, the social media user 106 may then provide additional information, such as the flight number or the booking number, in response to the inquiry. Process 400 may then proceed to block 406 with a known flight number or booking number that could readily lead to the identification of a passenger in a database at the travel data source 22 because the degree of certainty regarding the correlation is increased. When the identity of the user cannot be initially found, but is found after the user responds to the inquiry, the SMM system may store this association in the social media database 56 to be reused in the future for further identification and to guarantee future identification without the need of any further inquiries. This information may also be stored in the travel data source 22.

In block 414, if the flight number or booking number is known, the SMM system 20 requests data (e.g., flight information) related to the passenger from the travel data source 22 and/or corresponding to the category(ies) or topic(s) of the post. The data may include, for example, a flight number for a travel reservation present in a travel record for a passenger who has been correlated with the social media user to a sufficient degree of confidence. If not already done, the SMM system 20 may also access the social media API to determine a number of friends or followers, history of communications, etc. for the social media user from the user profile database 12 associated with the social media networking system 10. The SMM system 20 may also access profiles for social media managers stored in the social media database 56 to determine, for example, the categories handled by each social media manager, whether a particular social media managers is approved to deal with high priority customers, a number of unanswered messages in each social media manager's queue, etc. The SMM system 20 may use this information (e.g., category, priority, manager profiles, workload (the number of posts currently being handling), past interactions between the social media manager and the same customer) to route a post to a particular social media manager who is best qualified to answer the post. The SMM system 20 may also update the priority of the post based on the information (e.g., customer value) about the passenger retrieved from the travel data source 22 and, optionally, information about the social media user obtained from the social media network (i.e., user details retrieved via an API).

To determine the treatment of the post/request, the SMM system 20 checks whether the flag 'automated reply' is set (block 416). If the flag is set, then the SMM system 20 may formulate and automatically send an answer to the social media user (block 417) that is responsive to the content of the post, and may set the status of the post/request in the social media database 56 to 'answered' (block 420) in the social media database 56, store the answer in the social media database 56 with a link to the post and/or traveler, and update the dashboard 100 to indicate that an answer has been sent.

If the flag is not set to send an automated answer, then the SMM system 20 may display information relating to the post, the social media user, and the passenger to the social media manager at the dashboard 100 (block 418). To that end, the social media post may appear in a list of social media posts on the dashboard 110 visible to the social media manager. The content of the post and social media username may be displayed, as well as information such as the topic, the feeling, and the priority status of the social media post. When the social media manager selects one of the posts (e.g., by clicking or tapping on it), passenger/customer information retrieved from travel data source 22 and linking a traveler to the social media user may be displayed on the dashboard 100 for consideration by the social media manager. The social media manager can perceive a context for the social media post based on the contextual information characterizing the passenger and/or social media user displayed via the dashboard 100 and can respond to the post with an answer in a customized fashion reflecting the contextual information. The SMM system 20 may allow the social media manager to access a full history of past communications (e.g., posts received and sent) between the user and the travel provider that are stored in the social media database 56.

Based on the information displayed in the dashboard 100, the social media manager may construct, using the dashboard 100 shown in FIG. 3, an answer that is responsive to the post and then communicate the answer to the social media user. For example, the social media manager may be able to inform Kate Jhonson in response to her post that a vegan meal is not available on her flight to Nice. The travel provider may provide preferential service to special customers based on the customer profile details incorporated into the priority determination. Alternatively, the SMM system 20 may propose the generated automatic reply to the social media manager, who may edit and modify it in a customized manner before forwarding the answer to the social media user. In block 420, the SMM system 20 may set the status of the post/request in the social media database 56 to 'answered' (block 420) in the social media database 56, store the answer in the social media database 56 with a link to the post and/or traveler, and update the dashboard 100 to indicate that an answer has been sent.

A single traveler may have multiple accounts subscribing to different social media networking systems. Upon successful identification, the SMM system 20 may aggregate all the communications between the travel provider and the traveler across all social media accounts associated with the traveler, and provide a consolidated presentation of the communication history and the customer profile, which may improve servicing of the traveler. For instance, a user may use one social media account to publish a negative post expressing a complaint about a travel disruption on a travel provider. If the user later uses a different social media account to publish a non-negative post directed to the travel provider (e.g., a simple inquiry about future travel plans), the response from the travel provider may be more informed because of the ability to retrieve a consolidated presentation of posts across multiple social media accounts. The SMM system 20 may also take all social media accounts into consideration on the dashboard display, and when determining the disruption score, the customer value, past and future travel reservations, etc.

Referring generally to FIGS. 1-5, the embodiments of the SMM system provide an approach for identifying a user who made a post over a social media platform, and therefore enhance the efficiency of data processing and also solve a problem rooted in computer technology. Furthermore, the embodiments of the SMM system may also assign a priority to a user's social media post as well, which also allows for social media managers to provide a personalized, private response without the need to interact with the user in order to obtain booking information. Indeed, the social media manager may gain an enhanced understanding of the various requests made by users, and also allows for the social media manager to respond to a question more efficiently to improve overall customer satisfaction.

Figure 6:
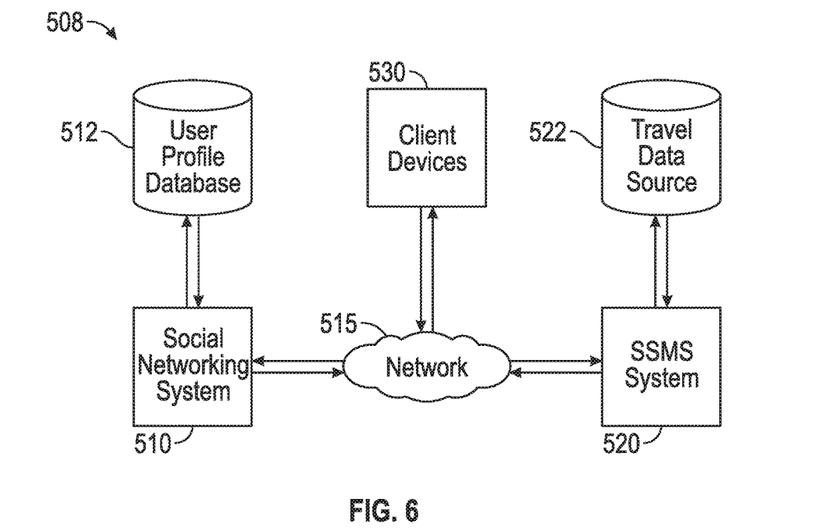
FIG. 6 is a diagrammatic view of an operating environment including a social (media) networking system, client devices, and a smart social media scanning (SSMS) in accordance with an embodiment of the invention.

FIG. 6 is an operating environment 508 in accordance with an embodiment of the invention, and may include a social media or networking platform or system 510, client devices 530, and a smart social media scanning (SSMS) system 520 that are all connected with each other through a network 515. The social networking system 510, which is similar to social networking system 10, may include or have access to a user profile database 512 similar to user profile database 12 that contains a profile for each social media user subscribing to the social networking system 510. The SSMS system 520 may have access to a travel data source 522 similar to travel data source 22.

The operating environment 508 may include a similar configuration as the operating environment 8 shown in FIG. 1, and the social networking system 510, SSMS system 520, and client devices 530 may be respectively similar to the social media networking system 10, SMM system 20, and client devices 30 (FIGS. 2, 4). The SSMS system 520 may be implemented on one or more computer devices or systems, such as exemplary computer system 230. However, unlike the embodiment as described in FIG. 1, the SSMS system 520 may be used to retrieve, from the travel data source 522, data relating to events (e.g., operational issues) that may have an impact on what the users of the client devices 530 may be posting on the social networking system 510. Specifically, as described in greater detail below, the SSMS system 520 may communicate with the travel data source 522 in order to receive information relating to an event that could have a reflection on social media posts pertaining to a particular travel provider (e.g., airline). The event may be, for example in an air travel context, that a flight was delayed, cancelled, suspended, overbooked, or a missed connecting flight. The SSMS system 520 may then monitor social media posts via a publish/subscribe mechanisms of an API of the social networking system 510.

Figure 7:
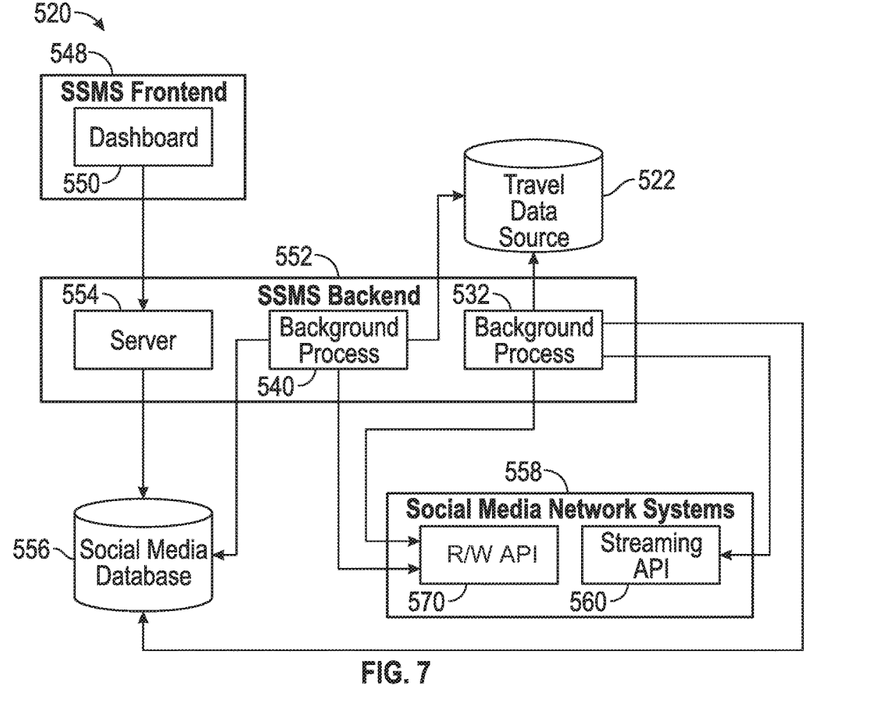
FIG. 7 is a diagrammatic view of the SSMS system illustrated in FIG. 6 and in accordance with an embodiment of the invention, where the SSMS system is in communication with social media networking systems and databases/data sources.

With reference to FIG. 7, the SSMS system 520 may be implemented on one or more computer devices or servers and databases. In the exemplary embodiment as shown in FIG. 7, the SSMS system 520 may include a front end 548 having a dashboard 550, a back end 552 including a server 554, a background process 532 executing on the server 554, and a background process 540 executing on the server 554. The SSMS system 520 may also be in communication with the travel data source 522 and a social media network system 558. The front end 548, the back end 552, the travel data source 522, and the social media network system 558 are in communication with one another via the network 515.

The server 554 of the back end 552 of the SSMS system 520 may interact with the front end 548 and its dashboard 550. Specifically, the server 554 is in communication with the social media database 556, which provides dynamic information that is contained in the graphics visible on the dashboard 550. The background process 532 of the back end 552 is in communication with one or more social media network systems 558 and the travel data source 522. Specifically, the background process 532 is in communication with the social media networking system(s) 558 via a streaming API 560 and a read/write API 570, which are both part of each social media network system 558.

The SSMS system 520 is configured to scan social media in an enhanced way using knowledge about an operational issue (an event) spotted using the travel data source 22 and to proactively search social media posts to identify those posts that may relate to the operational issue.

In an embodiment, the background process 532 may receive information from the travel data source 522 indicating that an event or operational issue has occurred or is predicted to occur (e.g., that a flight was delayed, cancelled, suspended, or overbooked, or a connecting flight is going to be missed by an inbound flight, lost baggage, airline personnel strike, ash cloud, snow storm). In response to determining that an operational issue has occurred or is predicted to occur, the background process 532 may formulate a set of keywords that are directly related to the operational issue. For example, if the SSMS system 520 learns from the travel data source that a particular flight (e.g., Flight XX0001 for Airline Y between city pair A and B) has experienced an operational issue or event (e.g., the flight is suspended), the SSMS system 520 may create a set of keywords (e.g., "suspension", "XX0001", "0001" "A", "B" and different word forms (e.g., suspended) and/or permutations of these keywords) associated with the event. The background process 532 may subscribe to one or more of the social media network systems 558 via the respective streaming API 560 for a limited time period (relating to the duration of the event providing the motivation for the proactive post scanning) and request posts that include one or more of the keywords. Posts by social media users may be identified by the social networking systems 558 based on the keywords and returned to the SSMS system 520. Some of the posts (e.g., "I'm so upset my flight to B is suspended!") may not explicitly mention the airline, but will be identified based on the presence of one of the keywords. The SSMS system 520 may analyze the returned posts and discard those posts that are unrelated to the event or that, for example, pertain to a different airline. This proactive approach may find relevant social media posts that would have otherwise been ignored. Those relevant social media posts may be stored in the social media database 556. Answers may be generated by the SSMS system 520 using the functionality of the SMM system 20 as described hereinabove.

The SSMS system 520 may learn from the identified posts and add new keywords to the existing keywords. For instance, the use of a new hashtag (e.g., XX0001_worst) in a post may be detected and used to formulate new keywords.

Figure 8:
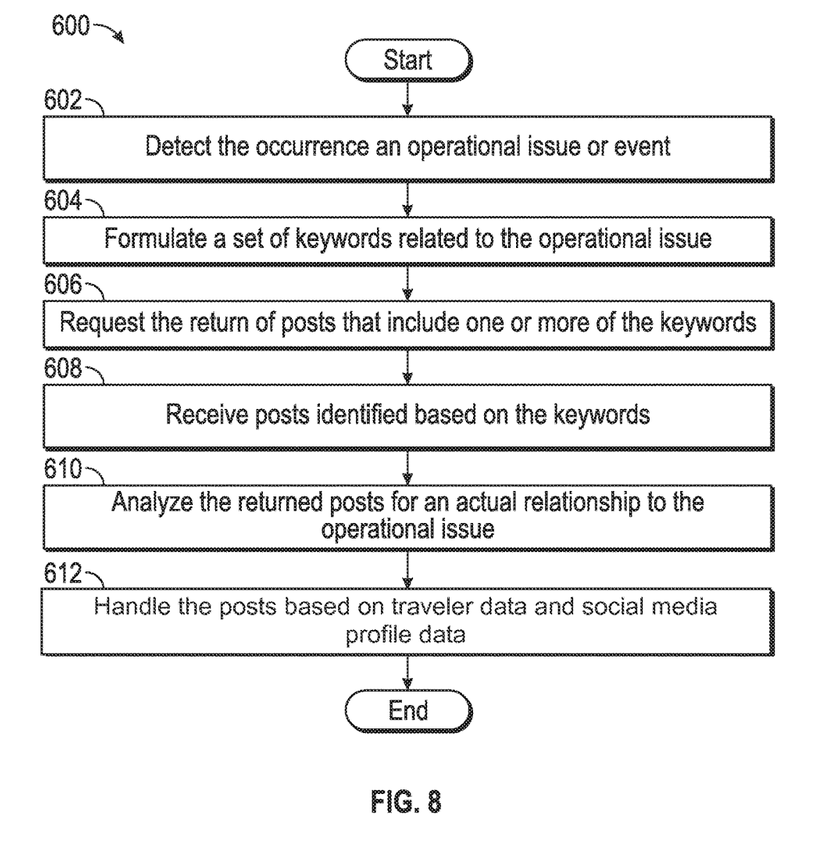
FIG. 8 is a flowchart in accordance with an embodiment of the invention that details a process that may be executed by the SSMS system to proactively listen for social media posts.

Turning now to FIG. 8, a flowchart that depicts a process 600 that may be performed by the SSMS system 520. The process 600 may begin at block 602, where the background process 532 of the SSMS system 520 may be notified about the occurrence of an operational issue or event pertaining to a particular travel provider (e.g., an airline in the representative embodiment) based on information pushed by or pulled from the travel data source 522. Once an operational issue (e.g., delayed flight, cancelled flight, suspended flight, overbooked flight, connecting flight to be missed by an inbound flight, lost baggage, airline personnel strike, ash cloud, snow storm) has occurred or is predicted to occur, process 600 may then proceed to block 604.

In block 604, the SSMS system 520 may formulate a set of keywords that are related to the operational issue. Process 600 may then proceed to block 606.

In block 606, the SSMS system 520 may subscribe to one or more of the social media network systems 558 via the respective streaming API 560 for a limited time period and request the return of posts that include one or more of the keywords. The limited time period may relate to the duration of the event prompting the proactive post scanning Process 600 may then proceed to block 608.

In block 608, the SSMS system 520 may receive posts by social media users that are identified by the social networking systems 558 based on the keywords. Process 600 may then proceed to block 610.

In block 610, the SSMS system 520 may analyze the returned posts and discard those posts that are unrelated to the event or that, for example, pertain to a different airline. Process 600 may then proceed to block 612.

In block 612, the SSMS system may handle the posts. Relevant social media posts may be stored in the social media database 556 and the posts may be handled by the SSMS system using the functionality of the SMM system 20 as described hereinabove. The social media manager may answer a particular post, especially if the post is negative and requires a reply to address the content of the negative post. However, instead of answering, the travel provider may decide to issue compensation to that travel correlated with the post, or the agent may decide to re-share/re-post the message in case the post that was proactively found is positive. For example, if the SMMS system 520 finds a post saying "I loved my flight to Nice today!", it may be in the interest of the travel provider to spread such post in the social media network 558 as a testimonial of their good service. The answers may be based on data in a customer profile retrieved from the travel data source 522 and, optionally, data obtained from the social media user profile. The posts may be assigned to a particular social media manager based on his skills (e.g., a disruption specialist) or to a particular social media manager specifically in charge of the event prompting the proactive listening for relevant posts.

Figure 9:
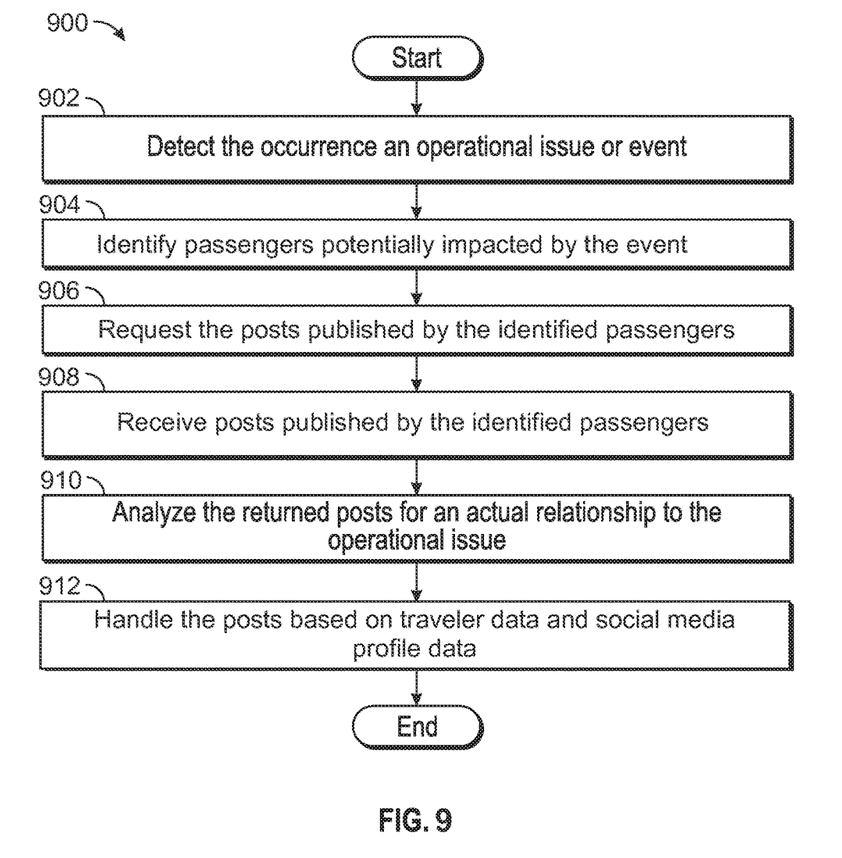
FIG. 9 is a flowchart in accordance with an embodiment of the invention that details a process that may be executed by the SSMS system to proactively listen for social media posts.

Turning now to FIG. 9, a flowchart that depicts a process 900 in accordance with an alternative embodiment that may be performed by the SSMS system 520 either in conjunction with the embodiment of FIG. 8 or independent of the embodiment of FIG. 8. The process 900 may begin at block 902, where the background process 532 of the SSMS system 520 may be notified about the occurrence of an operational issue or event pertaining to a particular travel provider (e.g., an airline in the representative embodiment) based on information pushed by or pulled from the travel data source 522. Once an operational issue (e.g., delayed flight, cancelled flight, suspended flight, overbooked flight, connecting flight to be missed by an inbound flight, lost baggage, airline personnel strike, ash cloud, snow storm) has occurred or is predicted to occur, process 900 may then proceed to block 904.

In block 904, the SSMS system 520 may query the travel data source to ascertain a list of passengers with travel reservations that may be potentially impacted by the operational issue. The information received from the travel data source 522 may include passenger identities and/or social media user names. Process 900 may then proceed to block 906.

In block 906, the SSMS system 520 may subscribe to one or more of the social media network systems 558 via the respective streaming API 590 for a limited time period and, based at least in part on the information from the travel data source 522, request the return of posts made by social media users that may be suspected or predicted to be impacted by the operational issue. The limited time period may relate to the duration of the event prompting the proactive post scanning Process 900 may then proceed to block 908.

In block 908, the SSMS system 520 may receive posts from social media users that are identified by the social networking systems 558 consistent with the request from the SSMS system 520. Process 900 may then proceed to block 910.

In block 910, the SSMS system 520 may analyze the returned posts and discard those posts that are unrelated to the event or that, for example, pertain to a different airline. Process 900 may then proceed to block 912.

In block 912, the SSMS system may handle the posts. Relevant social media posts may be stored in the social media database 556 and answers to the posts may be generated by the SSMS system using the functionality of the SMM system 20 as described hereinabove. The answers may be based on a customer profile obtained from the travel data source 522 and data obtained from the social media user profile. The posts may be assigned to a particular social media manager based on his skills (e.g., a disruption specialist) or to particular social media manager specifically in charge of the event prompting the proactive listening for relevant posts.

In another embodiment, the background process 532 may receive information from the travel data source 522 indicating that an event or operational issue has occurred (e.g., that a flight was delayed, cancelled, suspended, or overbooked, that a connecting flight is going to be missed by inbound flight, lost baggage, airline personnel strike, ash cloud, snow storm). In response to determining that an operational issue has occurred, the background process 532 may search the travel data source 522 for information related to the passengers that are specifically impacted or predicted to be impacted by the operational issue (i.e., passengers on a flight that was delayed or cancelled). The information may include, but is not limited to, the full or legal name of the passenger as well as the social media user names related to a social media account. This information facilitates proactive listening of the social media accounts of those passengers that are known to be impacted or potentially impacted by the event. For example, if the SSMS system 520 learns from the travel data source that a particular flight (e.g., Flight XX0001 for Airline Y between city pair A and B) has experienced an operational issue or event (e.g., the flight is suspended), the SSMS system 520 may generate a list of the social media accounts for passengers impacted by the event and then subscribe to receive posts from one or more of the social networking systems 558. Those relevant social media posts may be stored in the social media database 556 and answered using the functionality of the SMM system 20 as described hereinabove.

Referring generally to FIGS. 6-8, the disclosed SSMS system provides an approach for proactively detecting and identifying social media posts of particular characteristics and therefore enhances the efficiency of data processing and also solves a problem rooted in computer technology. Indeed, airlines and other members of the travel industry may value the idea of handling their social media interactions by social media managers, as this provides customers with the satisfaction that a human has handled their request. However, airlines and other travel-related companies may not have a sufficient number of employees to answer all of their social media posts. Automated answers may be disguised to appear as if they had been handled by a human; for example, a personal name/signature may be added at the end of each automatically-generated answer. The disclosed SSMS system may provide an approach for identifying social media posts that indirectly reference an airline, without the need for an agent to scour through numerous social media posts online. Even a computer, if not guided, may not be able to scour through the near infinite and permanently growing space of social media posts in the hope of finding those posts related to the travel provider event.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. For example, It is to be appreciated that while the embodiments as discussed describe social media management in the context of an airline system, the disclosed SMM system 20 and SMMS system 520 are not limited to use with just an airline. For example, in other embodiments, the SMM system 20 and SMMS system 520 may be used by on-line travel agencies, bricks-and-mortar travel agencies, may be employed in a distribution system, or may be applied generally to business entities in the travel industry, such as other types of providers (e.g., local content such as restaurants and activities). The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system for interacting with a social media networking system, the system comprising:
one or more processors; and
a memory coupled to the one or more processors, the memory storing data comprising a database and program code that, when executed by the one or more processors, causes the system to:
receive information related to occurrence of an event impacting travel;
in response to receiving the information related to the occurrence of the event, trigger a request to the social media networking system to return one or more first posts related to the event;
correlate social media users who generated the one or more first posts with customer profiles associated with passengers and stored by a travel data source;
rank the one or more first posts based on the correlated customer profiles; and
cause an answer to one of the one or more first posts to be automatically published on the social media networking system based on the correlation and the ranking.

2. The system of claim 1 wherein the program code, when executed by the one or more processors, further causes the system to:
formulate a plurality of keywords based on the information related to the occurrence of the event; and
receive the one or more first posts from the social media networking system that are identified based on the keywords, wherein the request includes the keywords.

3. The system of claim 2 wherein the program code, when executed by the one or more processors, further causes the system to:
determine a new keyword based on content of the one or more first posts; and automatically add the new keyword to the keywords.

4. The system of claim 1 wherein the program code, when executed by the one or more processors, further causes the system to:
trigger a request for one or more second posts published at the social media networking system by the social media users correlated with the passengers.

5. The system of claim 4 wherein the program code, when executed by the one or more processors, further causes the system to:
receive the one or more second posts from the social media networking system; and
cause an answer to one of the one or more second posts to be automatically published on the social media networking system.

6. The system of claim 1 wherein the program code, when executed by the one or more processors, further causes the system to:
receive the one or more first posts from the social media networking system; and
discard at least one of the one or more first posts as unrelated to the event.

7. The system of claim 1 wherein the program code, when executed by the one or more processors, further causes the system to:
execute a background process of a back end in communication with the social media networking system and a travel data source, wherein the background process is in communication with the social media networking system via a streaming application programming interface (API) and the streaming API is directed to receive a stream of public data flowing through the social media networking system.

8. A method for interacting with a social media networking system, the method comprising:
receiving, from the travel data source at the one or more computers, information related to occurrence of an event impacting travel;
in response to receiving the information related to the occurrence of the event, triggering, by the one or more computers, a request to the social media networking system to return one or more first posts related to the event;
correlating, by the one or more computers, social media users who generated the one or more first posts with customer profiles associated with passengers and stored by a travel data source; and
ranking, by the one or more computers, the one or more first posts based on the correlated customer profiles; and
causing, by the one or more computers, an answer to one of the one or more first posts to be automatically published on the social media networking system based on the correlation and the ranking.

9. The method of claim 8 further comprising:
formulating, by the one or more computers, a plurality of keywords based on the information related to the occurrence of the event; and
receiving, at the one or more computers, the one or more first posts from the social media networking system, wherein the request includes the keywords.

10. The method of claim 9 further comprising:
determining, by the one or more computers, a new keyword based on content of the one or more first posts; and
automatically adding the new keyword to the keywords.

11. The method of claim 8 further comprising:
triggering a request for one or more second posts published at the social media networking system by the social media users correlated with the passengers.

12. The method of claim 11 further comprising:
receiving, at the one or more computers, the one or more second posts from the social media networking system; and
causing, by the one or more computers, an answer to one of the one or more second posts to be automatically published on the social media networking system.

13. The method of claim 8 further comprising:
receiving, at the one or more computers, the one or more first posts from the social media networking system; and
discarding at least one of the one or more first posts as unrelated to the event.

14. A computer program product for interacting with a social media networking system, the computer program product comprising:
a non-transitory computer-readable storage medium; and program code stored on the non-transitory computer readable storage medium that, when executed by one or more processors, causes the one or more processors to:
receive information related to occurrence of an event impacting travel;
in response to receiving the information related to the occurrence of the event, trigger a request to the social media networking system to return one or more first posts related to the event;
correlate social media users who generated the one or more first posts with customer profiles associated with passengers and stored by a travel data source; and
rank the one or more first posts based on the correlated customer profiles; and
cause an answer to one of the one or more first posts to be automatically published on the social media networking system based on the correlation and the ranking.

15. The method of claim 8 further comprising:
executing, by one or more computers, a background process of a back end in communication with the social media networking system and a travel data source, wherein the background process is in communication with the social media networking system via a streaming application programming interface (API) and the streaming API is directed to receive a stream of public data flowing through the social media networking system.

* * * * *